United States Patent

Bohn et al.

[11] Patent Number: 5,820,158
[45] Date of Patent: Oct. 13, 1998

[54] PASSENGER-AIRBAG INSTALLATION MODULE

[75] Inventors: Stefan Bohn, Goldbach; Willi Wissel, Mömbris, both of Germany

[73] Assignee: TRW Automotive Safety Systems GmbH, Aschaffenburg, Germany

[21] Appl. No.: 813,886

[22] Filed: Mar. 7, 1997

[30] Foreign Application Priority Data

Mar. 11, 1996 [DE] Germany .................. 196 09 532.8

[51] Int. Cl.⁶ .................................................. B60R 21/16
[52] U.S. Cl. ........................................ 280/728.2; 280/732
[58] Field of Search ............................. 280/728.2, 732, 280/728.1, 743.1, 728.3

[56] References Cited

U.S. PATENT DOCUMENTS

| | | |
|---|---|---|
| 5,263,739 | 11/1993 | Webber et al. . |
| 5,431,432 | 7/1995 | Webber et al. ............. 280/728.2 |
| 5,454,588 | 10/1995 | Rose . |
| 5,474,323 | 12/1995 | Davidson . |
| 5,482,313 | 1/1996 | Ikeya et al. . |
| 5,503,425 | 4/1996 | Emambakhsh et al. ........... 280/728.2 |
| 5,564,732 | 10/1996 | Bauer et al. ............. 280/728.3 |
| 5,681,055 | 10/1997 | Green et al. ........... 280/728.2 |
| 5,735,542 | 4/1998 | Bohn ................... 280/728.2 |

FOREIGN PATENT DOCUMENTS

| | | |
|---|---|---|
| 2118301 | 7/1972 | France . |
| 2335373 | 12/1976 | France . |
| 75404885 | 12/1975 | Germany . |
| 4134673 | 4/1993 | Germany . |
| 19527788 | 2/1996 | Germany . |

Primary Examiner—Christopher P. Ellis
Attorney, Agent, or Firm—Sprung Kramer Schaefer & Briscoe

[57] ABSTRACT

A module for installing a passenger airbag, having a trough-like housing (1). The housing essentially comprises a U-shaped base (2) and two essentially flat ends (3). The module also includes a gas generator (4) and a gas sack (5). The gas sack is folded into the housing over the gas generator, One marginal section (6) of the gas sack (5) is wrapped outward around the edge (7) of the housing (1) all the way around. The marginal section (6) is looped along the base (2) around connecting rods (8). The connecting rods secure the ends (3) to the base (2) and extend within a groove-like inward-opening depression (9) in the base (2). A continuous tensioning band (10) attaches the marginal section (6) of the gas sack (5) to the outside of the housing (1) between the edge (7) of the housing and the connecting rods (8), constituting a force-application attachment.

7 Claims, 2 Drawing Sheets

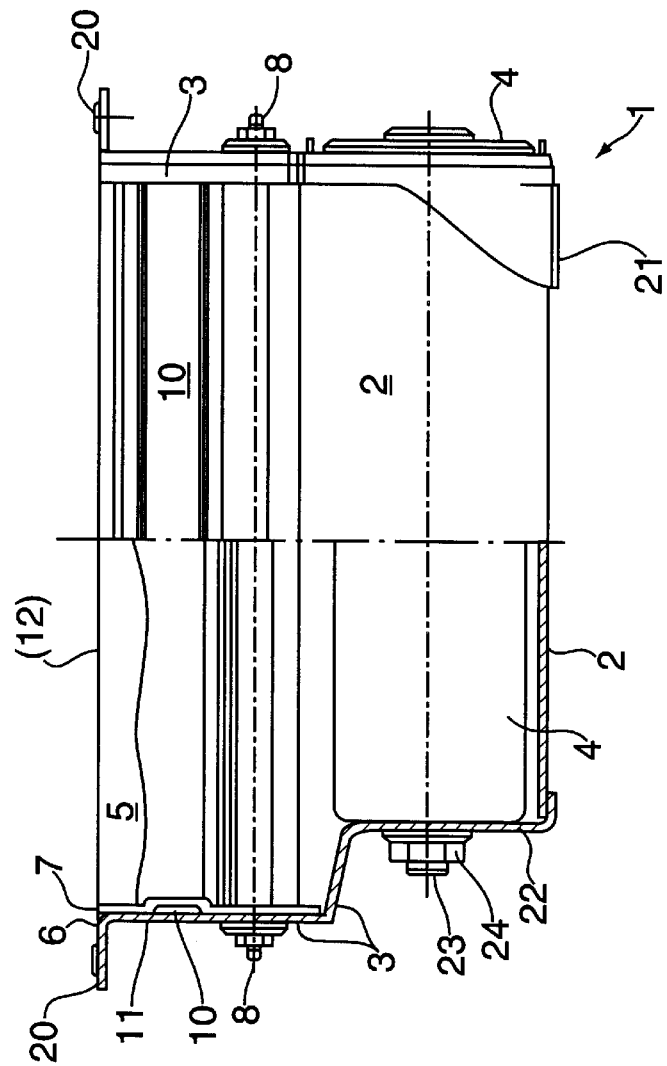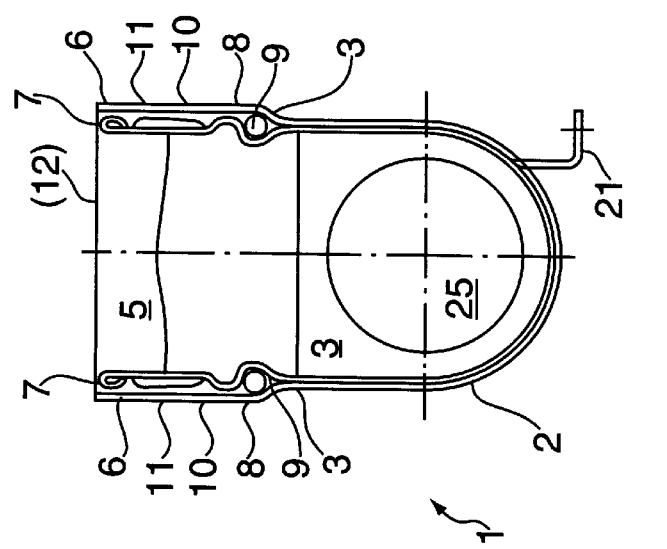

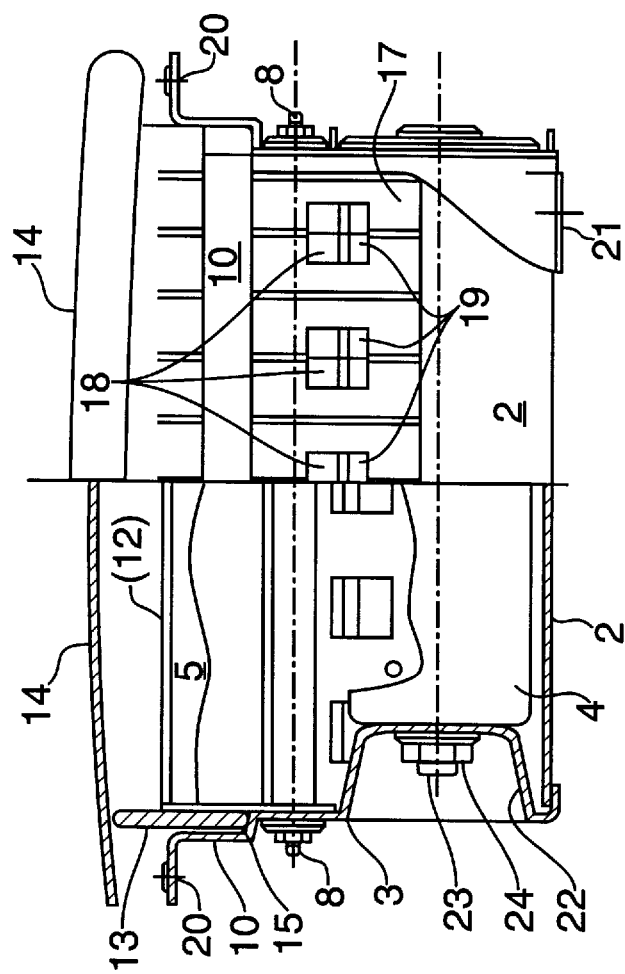
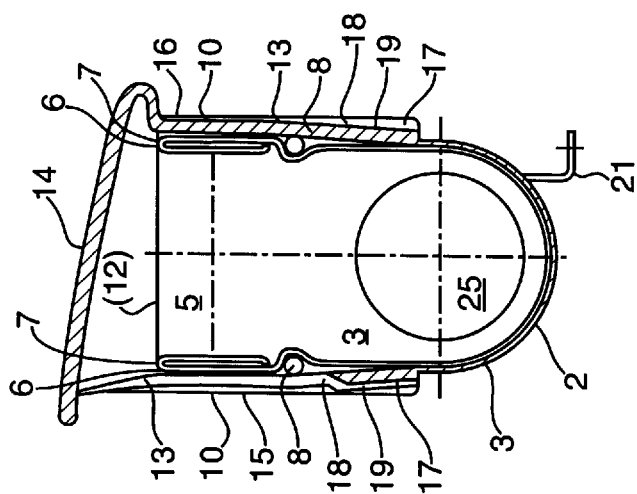

PASSENGER-AIRBAG INSTALLATION MODULE

BACKGROUND OF INVENTION

The present invention relates to a module for installing a passenger airbag. The module has a trough-like housing essentially comprising a U-shaped base and two essentially flat ends, with a gas generator and with a gas sack folded into the housing over the gas generator.

Modules of this type are, due to the increased equipping of motor vehicles with airbags, also being manufactured and installed more and more frequently at the passenger seat as either original or retrofitted equipment. Cost-effective manufacture, simple assembly, and as little space and weight as possible accordingly become important, as with any automotive accessory, with no sacrifice of course of function or operation.

Many embodiments of modules of this type are already known. One problem however has not as yet been satisfactorily addressed, specifically how to attach the gas sack to the parts rigidly fastened to the body of the car with due regard to the aforesaid aspects. Most cases require a lot of screws, rivets, or similar fasteners to secure the gas-bag fabric point by point around the area such that it will release when inflated. Aside from expense of such a procedure, there is also a risk that the fasteners will not drop out evenly and that individual points will be stressed during inflation far beyond the average stress they are designed for, leading to ripping. The gas sack will be damaged and fail, due to the loss of gas, to inflate all the way. In the worst possible case a rip at one point can lead to chain reactions, whereby the adjacent points can be suddenly subjected to too high a stress and rip apart in turn, whereupon the airbag will essentially be unable to function at all.

SUMMARY

The object of the present invention is accordingly to eliminate such drawbacks and to improve an airbag of the aforesaid type to the extent that operationally reliable attachment of the gas sack to the housing can be ensured at all times and by simple means.

This object is attained in accordance with the present invention in that one marginal section of the gas sack is wrapped outward around the edge of the housing all the way around, in that the marginal section (6) is looped along the base around connecting rods that secure the ends to the base and extend within a groove-like inward-opening depression in the base, and by a continuous tensioning band that attaches the marginal section of the gas sack to the outside of the housing between the edge of the housing and the connecting rods by force-application attachment.

The housing in one practical embodiment of the present invention has a shallow depression as wide as the tensioning band extending all the way around it. The shallow depression constitutes means of interlocking attachment of the marginal section of the gas sack to the housing.

If the gas sack has a protective cover, the marginal section of the protective cover can be secured to the housing along with the marginal section of the gas sack.

One marginal section of the lid that covers the gas sack can also be secured to the housing by the tensioning band along with the marginal section of the gas sack.

A shallow depression as wide as the tensioning band extends for this purpose along the lid's marginal section. This shallow depression constitutes means of interlocking attachment for securing the tensioning band to the lid.

The marginal section of the lid can also be hooked into brackets on the base of the housing by means of sections extending down beyond the location of the tensioning band and of recesses therein. The result is interlocking attachment of the lid to the housing.

It is finally also possible to achieve both interlocking attachment by means of the extending sections of the lid that are hooked into the brackets in conjunction with the connecting rods that extend along the groove-like depressions in the base and force-application attachment by means of the tensioning band.

In all these embodiments the previously conventional large number of points of attachment are replaced by the continuous tensioning band that attaches the gas sack to the housing either by force-application attachment alone or by force-application attachment in conjunction with interlocking attachment. This approach is a reliable way of avoiding peak stresses on individual points of attachment when the gas sack suddenly fills full of gas. The marginal section of the gas sack is continuously secured, resulting in stress that is essentially uniform over the total circumference in the event of inflation. Another advantage to this type of attachment is that it is essentially more elastic than point-by-point attachment with rivets or screws, so that ripping need not be immediately expected even when locally higher than average stresses occur as the result of tolerance or due to irregular inflation or unfolding of the gas sack, because force-application attachment alone or combined with interlocking attachment is essential more "yielding" and because the any stress peaks can be more easily counteracted by slight displacements of the clamped-in gas-sack fabric. The proposed method of attachment is accordingly not only simpler in design and to manufacture than known methods of attachment; it is also considerably safer and more reliable in operation.

BRIEF DESCRIPTION OF DRAWINGS

One embodiment of the present invention will now be specified by way of example with reference to the accompanying drawing, wherein FIG. 1 is a section through one embodiment, FIG. 2 is a longitudinal section through and side view of the embodiment illustrated in FIG. 1, FIG. 3 is a section through another embodiment, and FIG. 4 is a longitudinal section through and side view of the embodiment illustrated in FIG. 3.

DETAILED DESCRIPTION OF DRAWINGS

The housing 1 illustrated in FIG. 1 essential comprises a U-shaped base 2 and two flat ends 3. The tilted edges of ends 3 overlap the end of base 2 and are forced together by connecting rods 8. Base 2 and ends 3 are generally sections of sheet metal. Each has an upper edge 7 that is either rounded or has a section folded back 180°. This feature prevents the marginal section 6 of a gas sack 5, which is wrapped out around upper edge 7, from coming into contact with any sharp-trimmed edge of base 2 or ends 3. The marginal section 6 of gas sack 5 is looped around connecting rods 8. Rods 8 extend within a groove-like inward-opening depression 9. The actual attachment of marginal section 6 to housing 1 is accomplished by a continuous tensioning band 10, resulting in either an essentially force-application attachment or, in combination with a continuous shallow depression 11, a combination of force-application and interlocking attachment. The ends 3 can have perforations 24 and 25 for aligning and securing a gas generator 4. They can also have brackets 20 and/or bevels 21 for installing the module in the motor vehicle.

The marginal section of a protective cover 12 can also be attached to the housing along with the marginal section 6 of a gas sack 5 when the customer orders such a cover.

FIG. 2 illustrates partly in section and partly in view the components hereinbefore specified. Ends 3 can be provided with doubled areas (FIG. 2, left) if it seems practical in order to secure tensioning band 10 on the one hand and on the other to create points of attachment. In departure from their essentially flat shape, ends 3 can also have an inwardly elevated and hence shorter area 22 when gas generator 4 is not as long as the folded gas sack 5. As will be evident from FIG. 2, gas generator 4 is inserted into right-hand end 3 and secured by a screw 23 in left-hand end 3. Otherwise, the reader is referred to the specification of FIG. 1.

FIGS. 3 and 4 employ the same reference numbers employed in FIGS. 1 and 2 for parts that are similar in design or function. Only parts that differentiate the second embodiment from the first will be discussed. One basic difference is that the marginal section 13 of a lid 14 is, along with the marginal section 6 of gas sack 5 and optionally with one marginal section of protective cover 12, attached to the housing by continuous tensioning band 10. For this purpose a shallow depression 15 as wide as tensioning band 10 has been provided around the outside of the marginal section 13 of lid 14, creating a interlocking attachment for securing tensioning band 10 to lid 14.

A section 17 can also be provided extending down from the marginal section 13 of lid 14 and beyond the location 16 of tensioning band 10 with recesses 18 therein. Recesses 18 function in conjunction with brackets 19 on base 2 to create an interlocking attachment between lid 14 and housing 1 in that the downward-extending sections 17 hook into brackets 19. It is of course also possible to integrate, as illustrated, the downward-extending sections 17 into a continuous wall. The downward-extending sections 17 of lid 14 that hook into brackets 19 create in conjunction with the connecting rods that extend inside the groove-like depressions 9 in base 2 and with tensioning band 10 a combination force-application and interlocking attachment for gas sack 5 similar to the attachment specified with reference to the first embodiment.

Finally, one end 3 can have a backward-facing part 22 like the one illustrated on the left of FIG. 4 when necessary to fit the length of the housing to gas generator 4. The advantage of this embodiment over the one illustrated in FIG. 2 is that the U-shaped base 2 can have the same length overall. The top of the end can if necessary also be designed as illustrated on the left of FIG. 4 with two layers of material in the marginal section and bracket 20 integrated thereinto and pointing outward. The marginal section 13 of lid 14 will then be inserted from above and along with the particular tensioning band 10 being employed into the space left inside end 3.

We claim:

1. Module for installing a passenger airbag, having a trough-like housing (1) essentially comprising a U-shaped base (2) and two essentially flat ends (3), with a gas generator (4) and with a gas sack (5) folded into the housing over the gas generator, characterized in that one marginal section (6) of the gas sack (5) is wrapped outward around the edge (7) of the housing (1) all the way around, in that the marginal section (6) is looped along the base (2) around connecting rods (8) that secure the ends (3) to the base (2) and extend within a groove-like inward-opening depression (9) in the base (2), and by a continuous tensioning band (10) that attaches the marginal section (6) of the gas sack (5) to the outside of the housing (1) between the edge (7) of the housing and the connecting rods (8), constituting a force-application attachment.

2. Module as in claim 1, characterized in that the housing (1) has a shallow depression (11) as wide as the tensioning band (10) extending all the way around it and constituting an interlocking attachment of the marginal section (6) of the gas sack (7) to the housing.

3. Module as in claim 1, characterized in that the gas sack has a protective cover (12), one marginal section of which can be secured to the housing (1) along with the marginal section (6) of the gas sack (5) by the tensioning band (10).

4. Module as in claim 1, characterized in that one marginal section (13) of a lid (14) can be secured to the housing by the tensioning band (10) along with the marginal section (6) of the gas sack (5).

5. Module as in claim 4, characterized in that a shallow depression (15) as wide as the tensioning band (10) extends along the marginal section (13) of the lid (14), constituting an interlocking attachment for securing the tensioning band to the lid.

6. Module as in claim 5, characterized in that the marginal section (13) of the lid (14) can be hooked into brackets (19) on the base (2) of the housing (1) by means of sections (17) extending down beyond the location of the tensioning band (10) and of recesses (18) therein, constituting an interlocking attachment of the lid to the housing.

7. Module as in claim 6, characterized by the interlocking attachment constituted by the extending sections of the lid that are hooked into the brackets in conjunction with the connecting rods that extend along the groove-like depressions in the base and by force-application attachment constituted by the tensioning band.

* * * * *